United States Patent

Smith

[15] 3,679,894
[45] July 25, 1972

[54] ACCELERATION CONTROL SYSTEM FOR VEHICLES

[72] Inventor: Douglas F. Smith, Erie, Pa.

[73] Assignee: General Electric Company

[22] Filed: July 9, 1970

[21] Appl. No.: 53,582

[52] U.S. Cl. ........................... 246/182 C, 303/20, 324/162
[51] Int. Cl. ................................................ B60l 15/20
[58] Field of Search ............... 246/182 C; 303/20; 324/161, 324/162; 317/5

[56] References Cited

UNITED STATES PATENTS 3,522,973   8/1970   Klein et al. ..................... 324/162 X

OTHER PUBLICATIONS

John Markus, Sourcebook of Electron Circuits, McGraw-Hill Book Co., p. 627.

Primary Examiner—Arthur L. La Point
Assistant Examiner—George H. Libman
Attorney—Walter C. Bernkopf, Frank L. Neuhauser, Oscar B. Waddell and Joseph B. Forman

[57] ABSTRACT

Train acceleration indicating arrangement wherein a sample circuit samples a vehicle velocity signal for a brief interval during each sampling period and produces a sampling signal whose amplitude during each sample period is substantially constant and a function of the sampled velocity signal. Means are provided for algebraically adding an AC signal and the sampling and velocity signals to produce an AC output signal solely during sampling periods when the difference between the sampling and velocity signals exceeds a predetermined magnitude. A relay circuit actuated in response to the AC output signal provides an indication of satisfactory vehicle deceleration. The relay circuit is connected in an emergency circuit of the type applying full service brakes upon detection of an abnormal indication. Actuation of the relay circuit holds off additional actuation of emergency brakes in the event the vehicle decelerates adequately subsequent to detection of an abnormal indication.

11 Claims, 5 Drawing Figures

FIG. 1

INVENTOR.
DOUGLAS F. SMITH
BY Walter C. Bernkopf
HIS ATTORNEY

ACCELERATION CONTROL SYSTEM FOR VEHICLES

BACKGROUND OF THE INVENTION

This invention relates to vehicle acceleration detection and control systems and has particular application to rapid transit and other traction vehicle systems.

Traction vehicle propulsion and braking, hereinafter referred to as tractive effort, is commonly controlled by automatic arrangements. Automatic control arrangements are particularly required with high performance-high speed rail vehicles in order to provide for optimum operation at full capability and within stringent passenger safety requirements. In addition to systems for continuously controlling tractive effort there are discrete types of control systems, hereinafter referred to as emergency or override systems, which assume control of vehicle tractive effort only upon detection of an abnormality indicative of improper vehicle operation, such as excessive speed, or of a malfunction of vehicle components. Upon detection of an abnormality, the override systems modify vehicle operation as, for example, by automatically bringing the vehicle to a safe stop.

One type of emergency or override system is disclosed in U.S. Pat. No. 3,334,224–Allen et al. which is assigned to the assignee of the subject application. Allen discloses a continuous traction effort control system wherein braking is controlled by modulating the pressure in the air brake trainline from zero to full service brake pressure in response to a control signal. In the event sensors in the control system detect an abnormal condition, an emergency circuit commands the air brakes to the full service position in order to provide for a controlled stop of the vehicle. Safety consideration demand assurance that the vehicle is thereupon brought to a stop. It is accordingly desirable to have an additional emergency circuit, hereinafter termed a brake assurance circuit, which upon the detection of an abnormal condition, monitors the braking action of a vehicle and if necessary effects additional corrective action, such as by application of emergency brakes, to assure that the vehicle is brought to a stop. Such a brake assurance circuit, wherein the initial command for full service braking is supplemented if necessary by an automatic actuation of emergency brakes, provides increased reliability and safety. In addition it minimizes the need to actuate the emergency braking system in respect to systems wherein emergency brakes are directly applied upon detection of an abnormal condition. Unnecessary application of the emergency brakes is undesirable. Application of emergency brakes can result in uncomfortable jerking and additionally causes train delays in view of the time required to restore the pressure in the emergency braking circuit.

In a brake assurance circuit it is desirable to monitor the braking action of the vehicle by actually detecting the deceleration of the vehicle instead of detecting some indirect indication, such as the pressure of the service brakes, and to affect additional corrective action, as by application of emergency brakes, in the event the vehicle fails to decelerate at an adequate rate subsequent to the occurrence of an abnormal indication.

Furthermore emergency or override systems, and circuits contained herein, must be designed to assure fail-safe operation. Thus in the case of the desired brake assurance circuit and deceleration monitoring arrangement, a component failure should not provide an output which erroneously indicates an acceptable deceleration rate, instead such a component failure should result in an application of additional corrective action, i.e. the application of emergency brakes.

Accordingly, it is an object of this invention to provide a brake assurance arrangement assuring additional corrective action, such as by actuation of emergency brakes, in the event a vehicle deceleration insufficiently subsequent to the detection of operating abnormalities.

It is a further object to provide such a brake assurance circuit which will hold off application of additional corrective action if vehicle deceleration is above a predetermined minimum rate and, additionally, during a predetermined short time interval subsequent to the detection of abnormalities commensurate to the time normally required for the vehicle to decelerate at such minimum rate.

It is another object to the invention to provide an arrangement responsive to vehicle velocity which will indicate whether vehicle acceleration is above or below a predetermined magnitude or is within a predetermined range of magnitudes.

It is a further object to provide the aforesaid arrangements of a design to assure maximum fail-safe operation.

SUMMARY OF THE INVENTION

Briefly the present invention contemplates means for sequentially and briefly sampling a velocity signal, whose amplitude is a function of instantaneous velocity of a traction vehicle, to produce a sampling signal, means for algebraically adding the velocity signal, the sampling signal and, preferably, an AC signal to provide an output signal solely during time intervals when the amplitude difference between said velocity signal and said sampling signal is within a predetermined range, and means to derive from said output signal an indication of whether the vehicle acceleration or deceleration is of an acceptable magnitude.

In accordance to a further aspect of the invention a brake assurance circuit is associated with an emergency circuit of the type which actuates a first braking system to stop a vehicle upon sensing an indication of system abnormality. The brake assurance circuit utilizes the above described arrangement to hold off application of an additional, emergency, braking system during time intervals when the vehicle deceleration is detected to be of an acceptable magnitude.

The novel features believed to be characteristic of the invention are set forth with particularity in the appended claims.

The organization and manner of operation of the invention, together with further objects and advantages thereof, may best be understood by reference to the following description taken in connection with the accompanying drawings:

GENERAL DESCRIPTION

Figure 1:
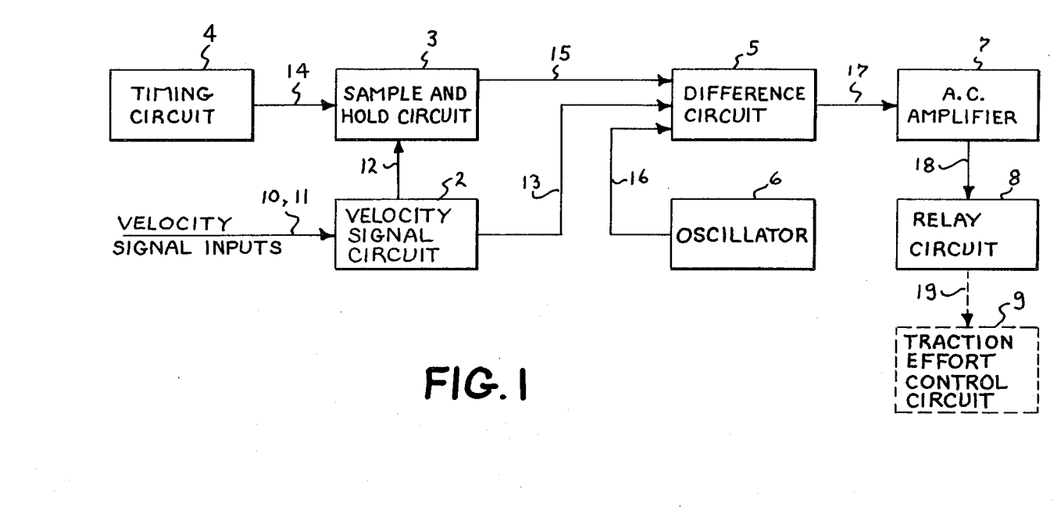
FIG. 1 is a simplified block diagram of an arrangement in accordance with the present invention, providing an indication of vehicle acceleration to control a tractive effort control circuit.
Figure 2:
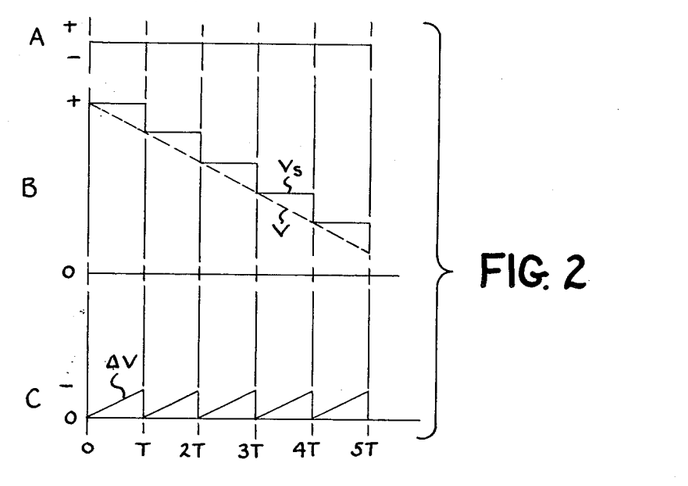
FIG. 2 is a plot of voltage versus time graphically illustrating characteristics of such an arrangement, with FIG. 2A illustrating certain timing signals and with FIG. 2B illustrating an idealized relationship between a velocity signal produced by a vehicle decelerating at a constant rate and the resultant sample signal, and with FIG. 2C illustrating the difference between the velocity and sample signals.

Traction vehicles normally have speed sensing circuits, associated with their propulsion and braking systems, which provide an electrical signal having an amplitude which is a function of the vehicle velocity, hereinafter termed a velocity signal. As illustrated in FIG. 1, the velocity signal is applied to the input of velocity signal circuit 2. Many traction vehicles utilize several velocity signals which are separately generated. If several velocity signals are available it is desirable, for reasons subsequently explained to connect them to several inputs such as 10 and 11 of the velocity signal circuit 2. The latter circuit provides the velocity signal to the sample and hold circuit 3 over line 12 and additionally provides this velocity signal over line 13 to one input of difference circuit 5. If the vehicle is assumed to decelerate at a constant rate, the velocity signal will linearly decrease in amplitude as illustrated by the dashed line wave form of FIG. 2B. Timing circuit 4 generates a train of equally displaced timing pulses which are applied over line 14 to sample and hold circuit 3. These pulses, are illustrated in FIG. 2A as occurring at time intervals T, 2T, 3T, etc. The sample and hold circuit samples the velocity signal applied on line 12 during the occurrence of each timing pulse. Sample and hold circuit 3 produces a sample signal having discrete portions each of which has a d-c amplitude level which is a function of the instantaneous amplitude of the velocity signal during the occurrence of each successive pulse. The amplitude of each discrete portion of the sample signal remains substantially constant for at least the majority of each sampling period. As illustrated in FIG. 2B by the solid line wave form, the sampling signal, $Vs$, generated by a linearly decreasing velocity signal $V$, has a staircase configuration. This sampling signal is applied by line 15 to a second input of difference circuit 5. If the sampling signal, $Vs$, is subtracted from the velocity signal, $V$, a velocity difference signal, $\Delta V$ results. FIG. 2C illustrates, in idealized form, a difference signal $\Delta V$ representative of a vehicle decelerating at a constant rate. The velocity difference signal, $\Delta V$ is a function of vehicle acceleration, since acceleration $=dv/dt$. If vehicle deceleration is presumed to be constant for at least the time between two successive pulses, i.e. the duration of a single sample time period, acceleration is proportional to the ratio of the magnitude of $\Delta V$ just prior to the time of resampling to the duration of the sample time period, T. Since the sample period, T, is constant, the magnitude of $\Delta V$ just prior to resampling is a function of deceleration, and the difference signal may be utilized to derive an indication of vehicle deceleration.

The velocity signal and sampling signal inputs are applied to difference circuit 5 to produce an output which is related to the above described velocity difference signal $\Delta V$. In addition oscillator 6 provides an alternating current signal over line 16 to the difference circuit 5. The output of the difference circuit, appearing on line 17, is related to the sum of the alternating current signal and the velocity difference signal $\Delta V$. The difference circuit 5 of the preferred embodiment utilizes an operational amplifier to algebraically add the alternating current signal, the sampling signal and the velocity signal to produce an output on line 17 which is a function of the sum of the velocity signal and the alternating current signal minus the sampling signal. Accordingly, the composite output signal appearing on line 17 is inverted in polarity in respect to the input signals. FIG. 3A illustrates the composite output signal for a vehicle slowing at a variable deceleration rate. At the occurrence of each sample pulse the composite signal initiates from a determined amplitude level ($c$) and decreases negatively in magnitude as a function of the velocity difference signal. Accordingly, the maximum voltage decrease during each sample time period is proportional to the instantaneous vehicle deceleration. FIG. 3A illustrates a composite signal for a vehicle whose deceleration rate increases during the time of the second, third and fourth sample periods. The composite signal is applied by line 17 to the input of AC amplifier 7.

AC amplifier 7 provides an alternating current signal output over line 18 to relay circuit B only during time intervals when the DC component of the composite signal is between a predetermined magnitude range which corresponds to a desired range of deceleration. In accordance to the preferred embodiment the AC amplifier has a conduction level indicated by dashed line ($d$) of FIG. 3A. During the absence of a composite signal, the AC amplifier is biased so as to be in saturation, in view of the application of potential ($c$) illustrated in FIG. 3A. The AC amplifier provides an output signal only in the event an AC signal is applied whose amplitude extends below the conduction level ($d$). Accordingly, the AC amplifier provides an AC output signal only in the event the AC component of the composite signal extends below the conduction level ($d$). Since the level of the AC component is a function of vehicle deceleration, the AC amplifier will produce an AC output signal only in the event the vehicle decelerates in excess of a predetermined rate. The wave forms illustrated in FIG. 3A during the first and second sample periods, correspond to the composite signal produced by a vehicle which decelerates at less than the predetermined rate. The AC component of the composite signal remains above the conduction level ($d$) and, as illustrated in FIG. 3B, no AC output is produced by the AC amplifier during the first and second sample periods.

Figure 3:
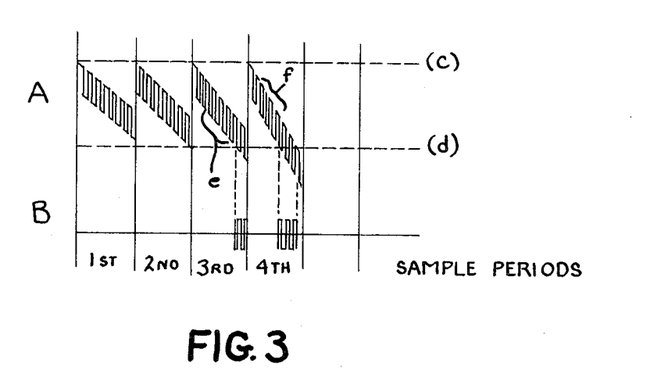
FIG. 3 is a plot of voltage versus time graphically illustrating additional characteristics of such an arrangement, with FIG. 3A illustrating a composite signal comprising an AC signal and a DC signal which is a function of the difference between the velocity and sample signals for a vehicle decelerating at a variable rate, and with FIG. 3B illustrating the corresponding AC output signal.

However, if the AC component of the composite signal extends below the conduction level ($d$) the AC amplifier is cut off. As illustrated in FIG. 3A, the AC amplifier commences to cut off when the minimum voltage level ($e$) of the AC component of the composite signal extends below the conduction level ($d$). The AC amplifier will conduct sequentially in accordance to the applied AC component during time intervals when the minimum voltage level ($e$) extends below the conduction level ($d$). Accordingly, an AC output signal is produced when the vehicle decelerates above a predetermined deceleration rate. As illustrated by the wave forms shown in FIG. 3 for the third sample period, the resulting AC output signal terminates at the end of the third sample period. In the event the vehicle decelerates at a greater rate, the DC component of the composite signal will further decrease. When the maximum voltage level of the composite signal illustrated as ($f$) in FIG. 3, extends below the conduction level ($d$), the AC amplifier will be continuously cut off and the AC output of the AC amplifier is terminated. This is illustrated in FIG. 3 for the wave form appearing during the fourth sample period, wherein the AC output signal is terminated substantially prior to the end of the fourth sample period.

The above described arrangement thus provides an AC signal output on line 18 whose presence is indicative of vehicle deceleration above a predetermined rate. The parameters of the system, such as components of the difference circuit 5 and of the AC amplifier 7, can be adjusted to establish the minimum deceleration rate for which an AC output is produced. In addition, system parameters can be adjusted so that the system will produce an output indication only in the event vehicle deceleration is within a predetermined rate range. This can be accomplished since the time duration of the AC output signal during each pulse period can be made to decrease with deviations of the deceleration rate from a preferred rate.

A relay circuit 8, responsive to the AC output signal applied by line 18, provides an output responsive to this AC output signal, by means indicated by dashed line 19, to a tractive effort control circuit 9. Various types of arrangements can be utilized. For example, the relay circuit can provide a signal or close a circuit, during the timer interval when the vehicle decelerates above a predetermined rate or within a predetermined band of deceleration rates. The arrangement when utilized in a brake assurance circuit provides an indication of vehicle deceleration. The preferred embodiment is accordingly described as a deceleration detection arrangement. However, the above described arrangement can, for other applications, be connected to operate as an acceleration as well as a deceleration control arrangement. For example, this can be achieved by interchanging the connection of lines 13 and 15 to the inputs of the difference circuit 5. The term acceleration, as used in the application is accordingly defined to mean either a positive or negative acceleration, and deceleration is defined as negative acceleration.

Figure 4:
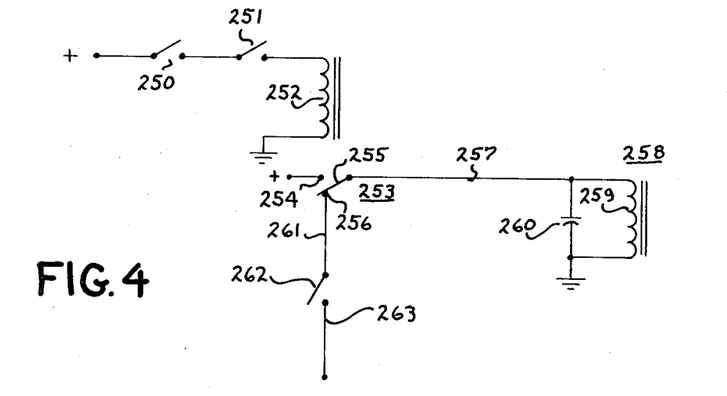
FIG. 4 is a simplified schematic diagram of a preferred embodiment of an improved emergency circuit incorporating a brake assurance circuit.
Figure 6:
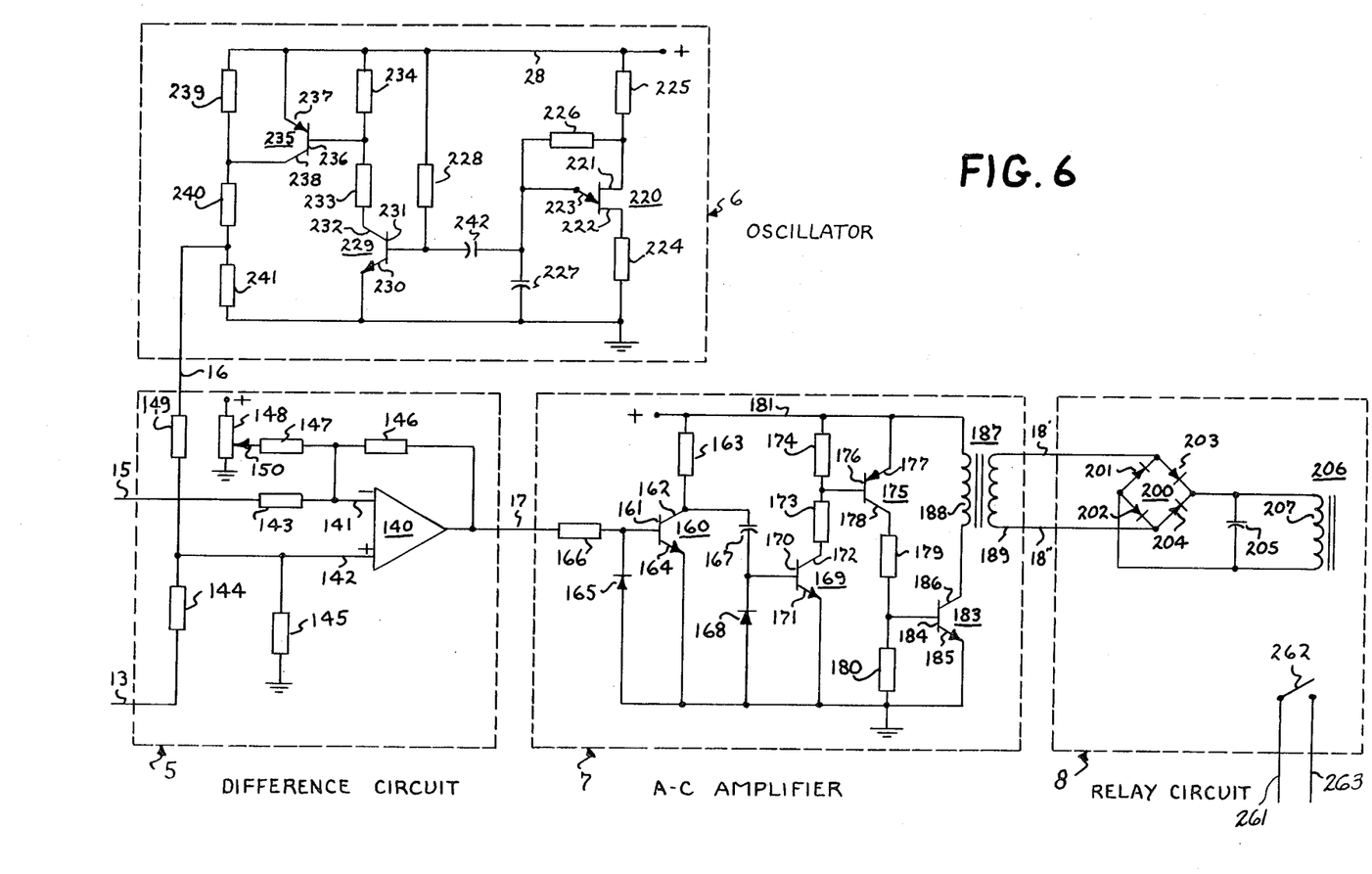

A further aspect of the invention contemplates use of the above described arrangement in a brake assurance circuit, wherein the output 19 of relay circuit 8 controls actuation of an emergency brake system. As previously stated the brake assurance circuit operates in combination with an emergency circuit of the general type disclosed in the referenced Allen patent. Allen discloses an arrangement wherein a plurality of vehicle parameters are sensed to generate a speed error signal which controls the tractive effort i.e., the propulsion or braking, of the vehicle. The operating parameters which are sensed may, for example, include, speed commands, which are supplied from wayside or from the vehicle cab, and actual vehicle velocity. In the event one or more preselected sensors provide an indication of an abnormal output, a relay circuit, hereinafter referred to as the automatic operation emergency relay, initiates a call for full service braking. As suggested by Allen one can, for example, use a speed error signal which is variable between zero volts and a predetermined positive potential with the zero volt speed error signal representing a call for full service braking. Full service braking can accordingly be applied by a switching arrangement, which causes the speed error signal input to the traction circuit to be grounded. FIG. 4 illustrates the emergency and brake assurance circuits in simplified form. The emergency circuit comprises an automatic operation emergency relay coil 252 connected serially with contractors 250 and 251 across a source of actuating potential. Serially connected contactors 250 and 251 are each associated with a particular function which must be monitored. The contactors 250 and 251 are illustrated in open position. However, they are closed during normal circuit operation. In the event one or more of the sensed operating parameters has an abnormal signal indication, the associated contactor opens so as to remove power from relay coil 252. This causes an associated set of contacts, not illustrated, to drop out so as to initiate a call for full service braking. The number of serially connected contactors (250, 251, etc.,) depends upon the number of operating functions which are to be monitored. These may, for example, include, (1) overspeed detection—resulting in the opening of a contactor in the event the vehicle speed is in excess of a commanded magnitude; (2 presence—running command presence'causing the opening of a contactor in the event neither a wayside or cab signal commanding vehicle propulsion is received, and (3) tachometer secury—causing the opening of a contactor in the event there is a discrepancy in the output of several tachometers indicating a false velocity indication. In accordance to the invention, an additional set of contactors 253, associated with automatic operation emergency relay coil 252, is connected to coil 259 of the emergency brake relay 258. Contactor 253 has an arm 255 which during normal system operation contacts terminal 254 which in turn is connected to a source of potential. The arm 255 is connected through line 257 and relay coil 259 to the other side of the power supply. During normal operation of the system, automatic operation emergency relay coil 252 causes contactor 255 to contact terminal 254 thus applying power to relay coil 259. While relay coil 259 is thus actuated, application of the emergency brake is held off. However, in the event power is not applied to relay coil 252, contact arm 255 is removed from terminal 254, thus removing power from relay coil 259. When the emergency brake relay 258 drops out, the emergency brakes are actuated. A finite time period, such as for example two seconds, elapses subsequent to drop out of the automatic operation emergency relay coil 252, before full service brake application causes a vehicle to decelerate at the appropriate braking rate, such as, for example, 2 mph per second. Provision must, therefore, be made to hold off drop out of the emergency brake relay 258 for such a finite time period. This may be accomplished by means of an integrating device, such as capacitor 260, which is connected in parallel with the emergency brake relay coil 259. Accordingly, the arrangement as thus far described provides for the application of emergency brakes a finite time period subsequent to drop out of the automatic operation emergency relay.

The brake assurance circuit, however, provides for holding off application of the emergency brakes thereafter in the event the vehicle decelerates in excess of a predetermined rate. Upon dropout of relay, 252 contact arm 255 closes with terminal 256 which is selectively connected to a source of potential by the output arrangement 19 of relay circuit 8. Terminal 256 is serially connected through line 261, contactor 262, and line 263 to a source of potential. Accordingly, operating potential continues to be applied to the emergency brake relay coil 259 during closure of contactor 262. Contactor 262 is controlled by relay circuit 8, and its operation is subsequently more fully described in connection with the relay circuit 8 illustrated in FIG. 6. The relay is normally open but is actuated during time intervals when an AC output signal is applied to relay circuit 8 over line 18. Accordingly, in accordance to the referenced embodiment a pulse of potential is applied to relay coil 259 during each pulse period when the vehicle decelerates at a satisfactory rate. The integrating action of capacitor 260 thus causes relay coil 259 to remain energized throughout the time the vehicle decelerates adequately. However, in the event the vehicle fails to decelerate properly, relay 258 drops out and the emergency brakes are applied. The brake assurance system thus detects vehicle deceleration and causes the application of an open emergency brake call in the event a predetermined deceleration, such as for example, 2 mphps, is not obtained within a predetermined time interval, such as 2 seconds, after the dropout of the automatic operation emergency relay.

Figure 5:
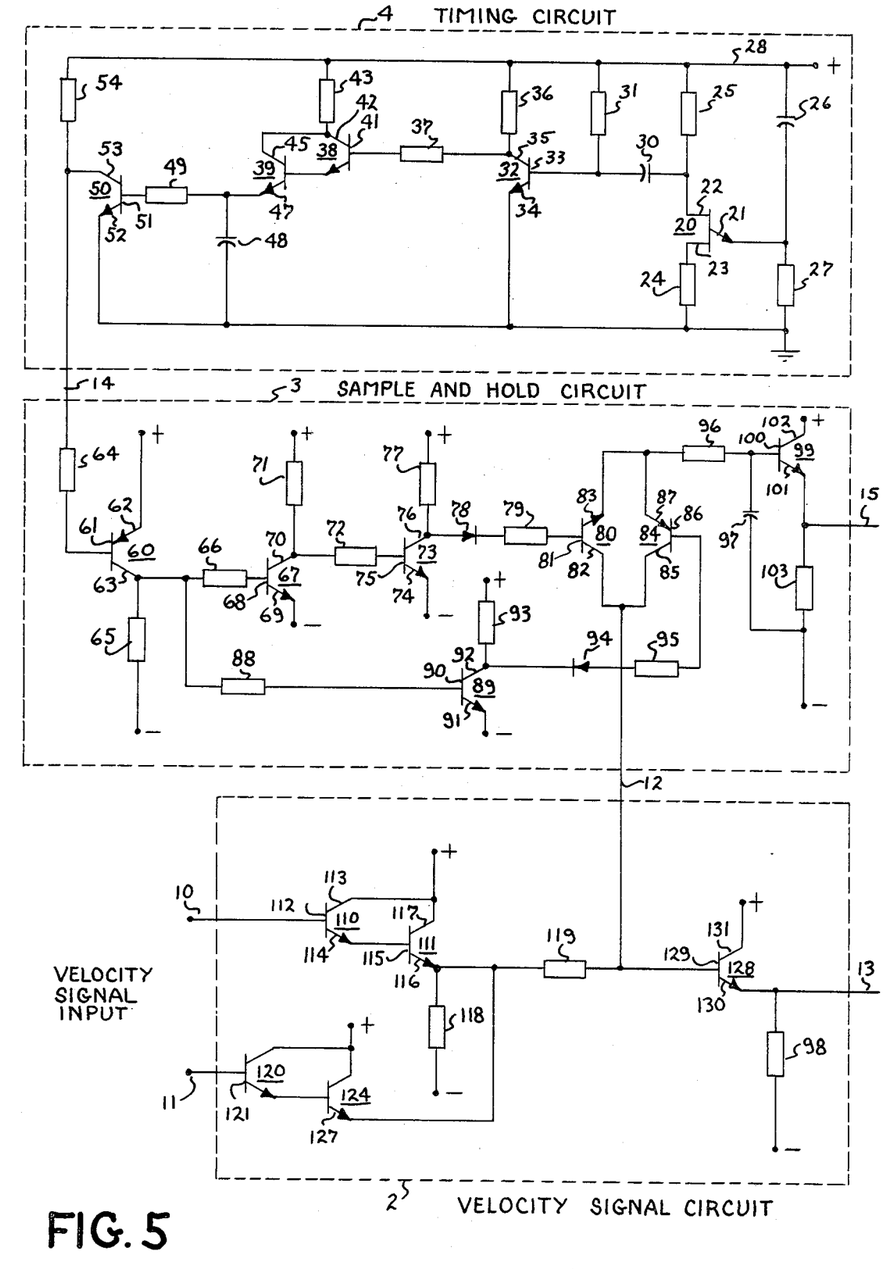
FIGS. 5 and 6 are schematic diagrams of a preferred embodiment of an arrangement, in accordance to the invention, for providing an indication of vehicle acceleration, with FIG. 5 illustrating a first portion and with FIG. 6 illustrating a second portion thereof.
Figure 7:
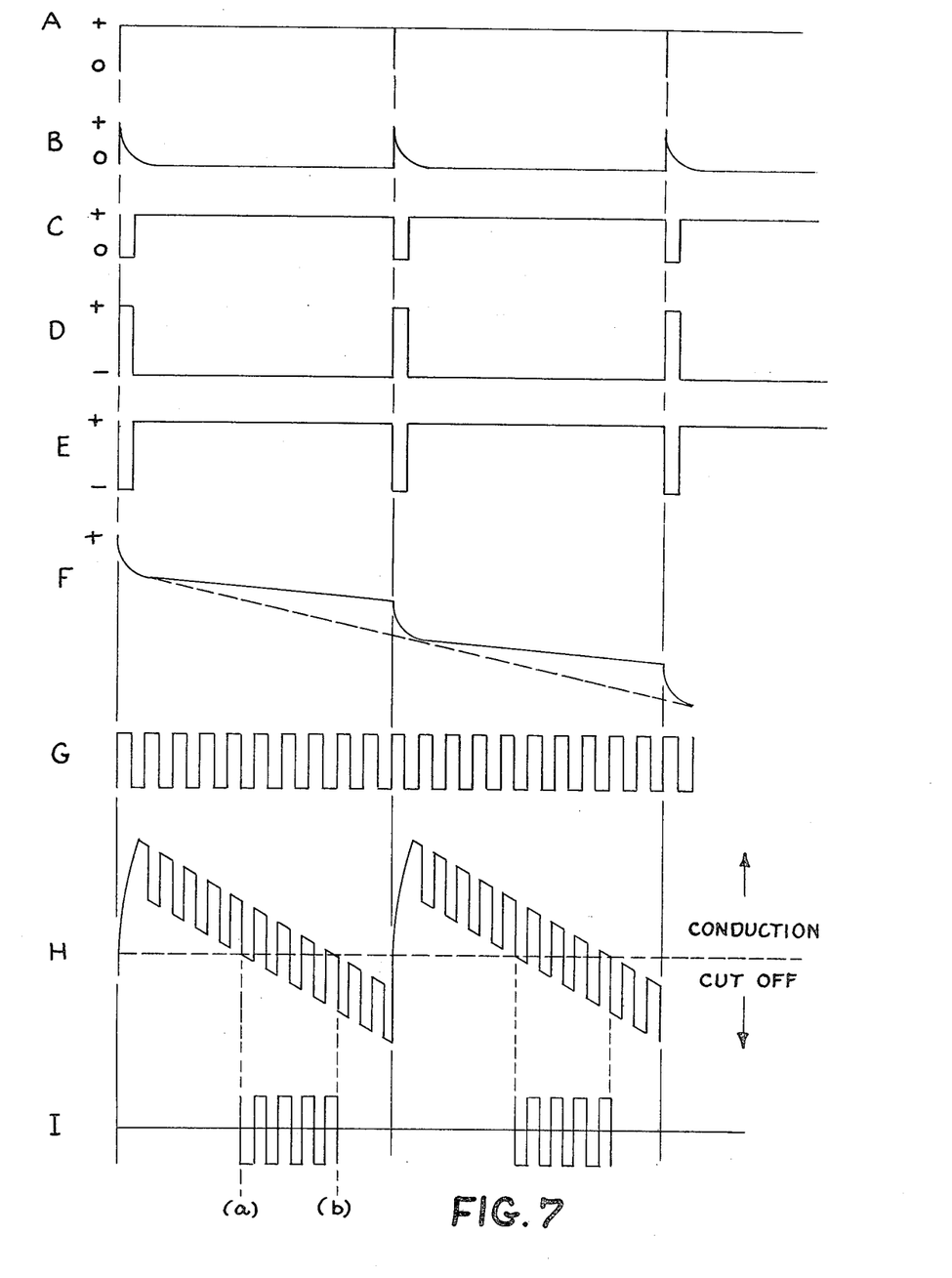
FIG. 7 is a graphic representation of certain voltage wave forms produced at various portions of the circuitry illustrated in FIGS. 5 and 6.

A preferred embodiment is now described in connection with the schematic diagrams of FIGS. 5 and 6 and the plot of wave forms illustrated in FIG. 7. Reference is now made to FIG. 5 which illustrates velocity signal circuit 2, sample and hold circuit 3 and timing circuit 4.

VELOCITY SIGNAL CIRCUIT

The velocity signal circuit 2 couples velocity signals having a DC magnitude linearly related to vehicle velocity through emitter follower circuits to the sample and hold circuit 3 and to the difference circuit 5. The velocity signals have a DC amplitude proportional to vehicle velocity. For example, the velocity signal may have an amplitude varying from zero volts at zero speed to some predetermined voltage, such as 10 volts, at a predetermined maximum speed, such as 100 mph. Velocity signals generated by tachometers which are axle mounted or otherwise driven from the train propulsion system can generally be utilized. Circuitry of the type disclosed in U.S. Pat. No. 3,210,630 of W. B. Zelina, assigned to the assignee of this application can be utilized to provide a DC voltage having a magnitude proportional to the frequency of the AC output of the tachometer and of vehicle velocity.

As illustrated in FIG. 5, one vehicle velocity signal is supplied from terminal 10 through base 112 of transistor 110. This transistor is connected in Darlington configuration to transistor 111 with collectors 113 and 117 being connected to a source of positive potential, and emitter 114 of transistor 110 being connected to base 115 of transistor 111. The emitter 116 of transistor 111 is connected through resistor 118 to a source of negative potential. Transistors 110 and 111 act as emitter followers which provide decoupling so as not to load down the circuitry providing the velocity signal. Emitter 116 is also connected through resistor 119 to line 12, which provides a velocity signal to the sample and hold circuit 3. The velocity signal is additionally connected from the junction of resistor 119 and line 12 to base 129 of emitter follower 128. Collector 131 is connected to a source of positive potential and emitter 130 is connected through resistor 98 to a source of negative potential. A second velocity signal output is coupled from emitter 130 through line 13 to the difference circuit 5, which is illustrated in FIG. 6.

As described in the referenced patents, traction vehicles commonly employ a plurality of velocity sensors in order to detect abnormal velocity signal outputs which may be caused by failure of tachometers or by wheel slide. In order to prevent faulty operation resulting from an erroneous velocity signal indication it is also desirable to apply a plurality of velocity signals to the velocity signal circuit. A second velocity signal input terminal 11 is accordingly illustrated as being connected to base 121 of transistor 120. This transistor is connected to transistor 124 in the same manner as described in respect to transistors 110 and 111. The second velocity signal output is connected from emitter 127 of transistor 124 to the junction of emitter 116 and resistor 119. The two velocity signals are thus connected in an OR configuration so that the velocity signal output at resistor 119 conforms to the potential of the most positive one of the two velocity signals. Of course, additional velocity signal inputs can be applied in a similar manner. Velocity signal abnormalities resulting from wheel slide or defective components normally result in a sharp reduction of the velocity signal. Therefore, in the event there is a magnitude difference between the applied velocity signals, the signal having the larger amplitude is utilized as the one representative of actual vehicle velocity and is applied at the junction of resistors 118 and 119 for application to the sample and hold circuit and to the difference circuit.

TIMING CIRCUIT

The timing circuit, illustrated in FIG. 5, generates sequential pulses of appropriate pulse repetition rate and pulse width for gating the sample and hold circuit. For purposes of example, the pulse width may be approximately 20 milliseconds and the pulse repetition rate may be approximately 1 pulse per second. The pulse width or time duration is dependent upon the time required to modify the sampling voltage at the occurrence of a sampling pulse. The pulse rate should preferably be selected so that there are a plurality of samples during the time interval normally required between the occurrence of abnormal signal indication and the time at which the vehicle decelerates at the predetermined rate. On the other hand the pulse rate should not be excessive so as to provide an adequate magnitude variation of the velocity signal between successive pulses. For example, assuming the velocity signal to have an amplitude of ten volts at 100 mph., a deceleration of 2 mphps will produce a voltage variation of 0.2 volts between successive sampling pulses occurring at the rate of one pulse per second. Substantially increasing the pulse repetition rate will correspondingly decrease the velocity signal and sample signal voltage variation between successive pulses and thus will require detection circuits of increased sensitivity in the brake assurance system.

The timing circuit of the preferred embodiment includes complimentary unijunction transistor 20 having a first base 23 connected through resistor 24 to ground, a second base 22 connected through resistor 25 to line 28, providing a source of positive potential. Emitter 21 is connected by resistor 27 to ground and capacitor 26 to line 28. The output, coupled from base 22 through capacitor 30 to base 33 of transistor 32, is normally at a positive potential. As capacitor 26 is slowly charged through resistor 27, the potential of emitter 21 is reduced so as to fire the unijunction transistor whereupon capacitor 26 is rapidly discharged through resistor 25 and device 20. The output of device 20, coupled to base 33, consists of a train of negative pulses as illustrated in FIG. 7A. Transistor 32, whose emitter 34 is grounded and whose collector 35 is connected through resistor 36 to line 28 is normally conducting in view of resistor 31 being connected from base 33 to line 28. A train of positive pulses is coupled from collector 35 through resistor 37 to base 41 of transistor 38 which is connected in Darlington configuration to transistor 39. Collectors 42 and 45 of these transistors are connected through resistor 43 to line 28 and emitter 47 of transistor 39 is connected through resistor 49 to base 51 of transistor 50. Capacitor 48, connected from emitter 47 to ground, is normally discharged while the Darlington pair is cut off. During the occurrence of positive pulses, the capacitor charges through the Darlington pair and resistor 43. NPN transistor 50, whose emitter 52 is grounded and whose collector 53 is connected through resistor 54 to line 28, is normally cut off. The positive voltage pulses, as illustrated in FIG. 7B, appearing at the junction of resistor 49 and capacitor 48 are coupled to base 51 to gate on device 50 during the time period corresponding to the desired pulse width of the sampling pulse. Capacitor 48 thus serves to stretch the timing pulses to the desired pulse width. Accordingly, as illustrated in FIG. 7C, a train of negative pulses having the desired duration, are coupled from collector 53 through line 14 to the sample and hold circuit 3.

SAMPLE AND HOLD CIRCUIT

As illustrated in FIG. 5, the timing, or sampling, pulses are applied from line 14 through resistor 64 to base 61 of transistor 60, whose emitter 62 is connected to a source of positive potential and whose collector is connected through resistor 65 to a source of negative potential. FIG. 7D illustrates the inverted pulses which are coupled from collector 63, respectively, through resistor 66 to base 68 of transistor 67 and through resistor 88 to base 90 of transistor 89. Collector 92 of device 89 is connected through resistor 93 to a source of positive potential and emitter 91 is connected to a source of negative potential as illustrated in FIG. 7 E, negatively extending pulses are coupled from collector 92 through diode 94 and resistor 95 to base 86 of transistor 84. These pulses gate device 84 into conduction during the occurrence of each of the pulses. Diode 94 is poled so as to prevent reverse avalanching through transistor 84 in the event there is a substantial potential difference between the collector 85 of device 84 and collector 92 of transistor 89.

The emitter 69 of transistor 67 is connected to a source of negative potential and collector 70 is connected through resistor 71 to a source of positive potential. Pulses of the type illustrated in FIG. 7E are coupled from collector 70 through resistor 72 to base 75 of transistors 73 whose emitter 74 is connected to a source of negative potential and whose collector 76 connected through resistor 77 to a source of positive potential. Positive extending pulses, as illustrated in FIG. 7D, are coupled from collector 76 through diode 78 and resistor 79 to base 81 of transistor 80. Device 80 is thus gated into conduction during the duration of each pulse. Diode 78 is poled to prevent reverse avalanching. NPN device 80 is connected in a back to back configuration with PNP device 84 with collector 82 of device 80 and collector 85 of device 84 being connected to velocity signal line 12 and emitter 83 of device 80 and emitter 87 of device 84 being connected to resistor 96. Resistor 96 is connected in series circuit with capacitor 97 to a source of negative potential.

During the occurrence of each sampling pulse device 80 and 84 are gated on so as to charge or discharge capacitor 97 to a potential corresponding to that of the velocity signal at the occurrence of the sample pulse. At the occurrence of the subsequent sampling pulse the capacitor voltage is modified so that the capacitor potential corresponds to the instantaneous amplitude of the velocity signal at the time of this subsequent pulse. This occurs since devices 80 and 84 act as emitter followers during the application of sampling pulses. For example, in the event the vehicle decelerates, the velocity signal voltage on the line 12 will decrease below the level to which capacitor 97 was previously charged. During subsequent sampling pulses, the capacitor will therefore discharge through resistor 96 and the emitter collector path of device 84 until the capacitor potential is reduced to the instantaneous potential on line 12. The complete discharge path includes line 12, limiting resistor 119, resistor 118 and the source of negative potential. Similarly, in the event the vehicle is accelerating, the instantaneous velocity signal voltage on line 12 will increase in respect to the potential across capacitor 97. Accordingly, during the occurrence of a sampling pulse capacitor 97 will be charged through the device 80, and resistor 96. The complete charging path extends from line 12, resistor 119 the collector emitter path of transistor 111 and the impedance of the power supply system.

The potential appearing across capacitor 97 is coupled through an emitter follower including device 99 and is applied by line 15 to an input of different circuit 5, which is illustrated in FIG. 6. The junction of resistor 96 and capacitor 97 is connected to base 100 of device 99 whose collector 102 is connected to a source of positive potential and whose emitter 101 is connected through a high impedance resistor 103 to a source of negative potential. The RC charge time for capacitor 97 is selected so that the capacitor can be charged or discharged during the duration of each sampling pulse. The impedance of resistor 103 is sufficiently large to prevent any major discharge of capacitor 97 during the interval between successive sampling pulses. For example, in one specific embodiment capacitor 97 comprised a 10 micro-farad capacitor, the series impedance of resistors 119 and 96 was approximately 250 ohms and the impedance of resistor 103 was 1 megohm. FIG. 7F illustrates the relationship between the velocity signal and the sample and hold signal in the case of a decelerating vehicle, with the dashed line representing the velocity signal voltage on line 12 and the solid line representing the sampling voltage across capacitor 97, and on line 15.

OSCILLATOR

Oscillator 6, illustrated in FIG. 6, provides alternating current signal over line 16 to the different circuit 5. This AC signal has a frequence which is substantially higher than the recurrence rate of the sampling pulses. In the preferred embodiment this signal is generated by unijunction device 220 whose first base 222 is connected through resistor 224 to ground and whose second base 221 is connected through resistor 225 to a source of positive potential occurring on line 28. Emitter 223 is connected by resistor 226 to base 221 and by capacitor 227 to ground. Capacitor 227 charges through resistors 226 and 225 until the device 220 fires. Capacitor 227 discharges through resistor 224 causing device 220 to cut off and capacitor 227 to again commence charging. The resulting pulses are coupled through capacitor 242 to base 231 of normally conducting NPN device 229. Conduction of that transistor is normally maintained by resistor 228 connected between base 231 and line 28. Emitter 230 is connected to ground and collector 232 is connected through the series combination of resistors 233 and 234 to line 28. Positive pulses are coupled from the junction of resistors 233 and 234 to base 236 of normally conducting PNP device 235. The emitter 237 is connected to line 28 and the collector 238 is connected to the junction serially of connected resistors 240 and 239. Resistor 240 is serially connected through resistor 241 to ground and resistor 239 is connected to line 28. This voltage divider provides an oscillator output signal, as illustrated in FIG. 7G, from the junction of resistors 240 and 241 via line 16 to the difference circuit 5. The frequency of the oscillator signal may, for example, be approximately 5 kilocycles. The amplitude of this signal may be readily adjusted by variation of the components in the voltage divider network comprising resistors 239, 240 and 241 since transistor 235 normally acts as a shunt across resistor 239 which shunt is periodically opened during the application of pulses to the base transistor 235.

DIFFERENCE CIRCUIT

The difference circuit, illustrated in FIG. 6, includes operational amplifier 140 which has a first, non-inverting input 142 and a second, inverting, input 141. The output, of the operational amplifier connected to line 17, is also connected through feedback resistor 146 to inverting input 141. The velocity signal is applied from velocity signal circuit 2, illustrated in FIG. 5, through line 13 and resistor 144 to input 142. The AC signal produced by oscillator 6 is additionally applied to input 142 through line 16 and resistor 149. An additional resistor 145 is connected from input 142 to ground. The sampling signal is applied from sample and hold circuit 3, illustrated in FIG. 5, through line 15 and resistor 143 to inverting input 141. In addition input 141 is connected through decoupling resistor 147 to arm 150 of potentiometer 148 which is connected intermediate ground and a source of positive potential. The positive potential applied to input 141 by this biasing network provides a positive output signal on line 17 in the absence of input signals. As previously described in connection with FIG. 3, the operational amplifier output on line 17 produced by the velocity comprises a composite signal of the previously discussed velocity difference signal and of the AC signal from the oscillator. This composite signal, initiates at a predetermined positive potential and decreases in amplitude until the occurrence of the next firing pulse. A typical composite signal appearing on line 17 is illustrated in FIG. 7H. Adjustment of potentiometer 148 determines the maximum potential of the composite signal and accordingly the minimum potential reached at the time of next sampling pulse. Accordingly, potentiometer 148 can be adjusted to vary the deceleration rate to which the brake assurance system is responsive.

AC AMPLIFIER

The AC amplifier 7, illustrated in FIG. 6, produces an AC output signal on lines 18' and 18" when the vehicle decelerates in excess of a predetermined deceleration rate. The output of the difference circuit 5 is coupled by line 17 through limiting resistor 166 to base 161 of transistor 160. Collector 162 is connected through resistor 163 to line 181, a positive potential line. The emitter 164 is grounded. Diode 165 is connected from ground to base 161 being poled, to prevent reverse avalanching. In the absence of any composite signal or of any difference velocity signal, the bias adjustment of the operational amplifier causes a positive potential to be applied to base 161 which maintains device 160 in saturation. In the event the vehicle decelerates a composite signal, as illustrated in FIG. 3H, is applied to base 161. When the negative peak voltage of the AC component of the composite signal decreases below the conduction level of device 160 the device will be cut off sequentially in conformance with the AC component wave form. As illustrated in FIG. 7H, this occurs subsequent to the time indicated by dashed line (a). AC conduction continues until the positive peak voltage of the AC component has decreased below the conduction level of the device. As illustrated in FIG. 7H, such intermittent conduction occurs until the time (b), subsequent to which time device 160 is entirely cut off. Capacitor 167 is connected from collector 162 of device 160 to base 170 of device 169 whose emitter 171 is grounded and whose collector 172 is connected through the series combination of resistors 173 and 174 to line 181. Diode 168 is connected from ground to base 170 and is poled in the same manner as diode 165 and to allow a discharge path for capacitor 167 through device 160. The junction of resistors 173 and 174 is coupled to base 176 of PNP transistor 175 whose emitter 177 is connected to line 181 and whose collector 178 is connected through serially connected resistors 179 and 180 to ground. The junction of resistors 179 and 180 is connected to base 184 of device 183 whose emitter 185 is grounded and whose collector 186 is connected through primary winding 188 of transformer 187 to line 181. During such time as the input signal on line 17 is above the conduction level of device 160, i.e., prior to time (a) as illustrated in FIG. 7H, transistor 169 is cut off. Accordingly, devices 175 and 183 are similarly cut off. During the time interval between (a) and (b) as illustrated in FIG. 7H, device 160 conducts sequentially in accordance to the applied AC signal and produces at its collector a signal of the type illustrated in FIG. 7I. This results in similar sequential conduction of devices 169, 175, and 183 during such time as an AC signal appears on the collector of device 160. The AC output signal appearing on secondary winding 189 of transformer 187 is coupled by lines 18' and 18'' to relay circuit 8.

RELAY CIRCUIT

The relay circuit 8, illustrated in FIG. 6, is responsive to the AC output signal provided by the AC amplifier 7, and provides an output, indicated as 19, in FIG. 1, to control a tractive effort control system. The AC output signal is applied by lines 18' and 18'' to full wave rectifier 200, consisting of diodes 201 through 204 connected in a bridge configuration. The rectifier output is connected across coil 207 of relay 206. The rectifier filter capacitor 205 is connected in parallel with this coil. Contactor 262 of relay 206, which is illustrated in its non-energized position, has its terminals connected to lines 261 and 263 also illustrated in FIG. 4. The AC output signals applied to the input of the bridge circuit are rectified so that AC output signals having a time duration in excess of a predetermined minimum time period cause actuation of contact or 262. Accordingly, contactor 262 is briefly closed during each sampling period during which an AC output signal is produced which has a time duration in excess of this minimum period.

As previously stated in connection with FIG. 4, automatic operation emergency relay coil 252 is de-energized when an abnormal condition is sensed by the emergency circuit and arm 255 of contactor 253 is removed from terminal 254 and is connected to terminal 256. Accordingly, potential is applied to maintain energization of emergency brake hold off relay 258 only during such time intervals when contactor 262 is closed. While the vehicle decelerates above the predetermined minimum rate, the contactor 262 will close during each sampling period and will provide pulses of positive potential to relay coil 259. The integrating action of capacitor 260, connected across the coil, will assure that the emergency brake hold off relay 258 remains actuated throughout such time. However, if the vehicle fails to decelerate at the minimum predetermined rate, the contactor 262 will remain open causing the emergency brake hold off relay to open so as to result in emergency brake actuation. In accordance to the preferred embodiment contactor 262 sequentially closes for short time intervals commensurate approximately to the duration of the duration of the AC output signal, whereby a brief closure of the contactor is indicative of a vehicle deceleration above a predetermined rate or within a predetermined acceleration band. The integrating action of capacitor 260 causes the emergency brake relay 258 to remain actuated throughout the time period that the vehicle decelerates at an appropriate rate. However, for other applications, the integration function can be accomplished by a single relay circuit such as relay circuit 8.

The described arrangement produces periodic difference or composite signals varying in magnitude as a function of vehicle deceleration. The AC output signal, utilized to generate an output indication, is preferably produced only when the difference or composite signal is of a predetermined intermediate range of amplitudes. Certain commonly encountered component failures preclude continued generation of the AC output signal thus providing, in the case of the brake assurance system, for actuation of additional braking means. For example, certain types of components failures, such as excessive leakage of capacitor 97 or a shorting of transistor 84 should prevent generation of difference or composite signals having a magnitude sufficiently great to gate on AC amplifier 7. Other types of component failures, such as failures preventing periodic discharge of capacitor 97, will produce difference or composite signals whose magnitude will attain levels causing AC amplifier 7 to be totally cut off.

While there have been shown and described the novel features of the invention as applied to a specific embodiment thereof, many changes, additions, and modifications in arrangements, operation and application may be made without departing from the true scope and spirit of the invention as defined in the appended claims.

What is claimed as new and desired to secure by Letters Patent of the United States is:

1. In an emergency circuit for controlling tractive effort of traction vehicles, wherein emergency control means actuate first braking means in response to an indication of abnormal vehicle operation, a brake assurance circuit adapted to actuated additional braking means comprising:
   a. first relay means controlled by said emergency control means to hold off actuation of said additional braking means until the occurrence of said aforesaid indication;
   b. a source adapted to provide velocity signals having a magnitude proportional to instantaneous vehicle velocity;
   c. sampling means for periodically sampling said velocity signals to produce sampling signals;
   d. signal coupling means responsive to said sampling and velocity signals and producing an output indication during time intervals when the amplitude difference between said sampling and velocity signals has a magnitude corresponding to vehicle deceleration at a predetermined satisfactory rate;
   e. second relay means responsive to said output indication and connected to hold off actuation of said additional braking means during intervals when said vehicle decelerates at satisfactory rates.

2. The brake assurance circuit of claim 1, further comprising:
   a. a source of AC signals having a frequency substantially in excess of the rate at which said velocity signals are periodically sampled;
   b. means for providing said AC signals to said signal coupling means;
   c. said signal coupling means providing, as an output indication, AC output signals during time intervals when the amplitude difference between said sampling and velocity signals is intermediate a predetermined magnitude range representative of acceptable vehicle deceleration.

3. The brake assurance circuit of claim 2 wherein said sampling means comprises a source of periodically recurring sample pulses and wherein said velocity signals are sampled during the occurrence of said pulses to produce sampling signals having an amplitude which is a function of the instantaneous velocity signal during the occurrence of said pulses.

4. The brake assurance circuit of claim 3 wherein said emergency control means causes the removal of operating potential from said first relay means concurrent with an indication of abnormal operating condition and wherein said second relay means is connected to provide operating potential to said first relay means when the vehicle decelerates above a predetermined rate subsequent to the occurrence of said indication of abnormal vehicle operation.

5. The brake assurance circuit of claim 4 wherein said first relay means are constructed to hold off actuation of said additional braking means for a time subsequent to the removal of operating potential commensurate to the time normally required for the vehicle to attain a predetermined deceleration rate and wherein said second relay means provides to said first relay means pulses of operating potential for time intervals substantially commensurate to the occurrence of AC output signals, whereby said first relay means holds off actuation of said additional braking means during time periods when said vehicle decelerates at predetermined satisfactory rates.

6. The brake assurance circuit of claim 3 wherein the time duration between successive sampling pulses is substantially in excess of the time duration of each sample pulse and the sampling signals have a substantially constant amplitude for at least the majority of the time duration between successive pulses.

7. The brake assurance circuit of claim 6 wherein said signal coupling means comprises:

a. adding means for algebraically adding said DC velocity signal, said sampling signal and said alternating current signals to produce a composite signal comprising an alternating component and a DC component having a level varying as a function of the difference between said sampling signals and said velocity signals;
b. AC amplifying means;
c. means for coupling said composite signal to said AC amplifying means, said AC amplifying means being constructed to provide AC output signals solely during time intervals when the amplitude difference between said velocity signals and said sampling signals is intermediate a predetermined amplitude range.

8. In a traction vehicle control circuit an arrangement adapted to control vehicle operation responsive to whether vehicle acceleration is above or below a predetermined magnitude, comprising:
a. a source adapted to provide a DC velocity signal having a magnitude proportional to instantaneous vehicle velocity;
b. means for sampling said DC velocity signal at a predetermined sampling rate to produce a sampling signal comprising successive discrete portions each having a DC amplitude level which is proportional to the instantaneous amplitude of said velocity signal at the associated time of sampling;
c. a source of alternating current signals having a frequency substantially greater than said sampling rate;
d. signal coupling means connected to receive all of the aforesaid signals and providing an AC output signal during time intervals when the magnitude difference between said velocity signal and said sample signal is intermediate a predetermined amplitude range;
e. utilization means connected to said output means and having different output states during the presence and absence of said AC output signal so as to provide an indication of whether vehicle acceleration is above or below a predetermined magnitude.

9. In a traction vehicle control circuit the arrangement of claim 8 wherein said sampling means comprises:
a. a source of pulses recurring at predetermined time intervals which are several orders of magnitude in excess of the time duration of each pulse;
b. means for sequentially sampling said DC velocity signals during the occurrence of successive ones of said pulses and producing said sample signal wherein said successive discrete portions each have a substantially constant amplitude for at least the majority of said sampling period.

10. In a traction vehicle control circuit the arrangement of claim 9 wherein said signal coupling means comprises:
a. adding means for algebraically adding said DC velocity signal, said sampling signal, and said alternating current signal to produce a composite signal comprising an alternating current component and a DC component having a level varying as a function of the difference between said velocity signal and said sampling signal;
b. AC amplifying means;
c. means for coupling said composite signal to said AC amplifying means being constructed to provide an AC output signal solely during time intervals when the magnitude difference between said velocity signal and said sampling signal is intermediate a predetermined amplitude range.

11. In a traction vehicle control circuit an arrangement adapted to provide an output indication indicative of whether vehicle deceleration is above or below a predetermined magnitude comprising:
a. a source adapted to provide a DC velocity signal having a magnitude proportional to instantaneous vehicle velocity;
b. pulse means for generating a train of timing pulses separated by equal sample time periods, each of which periods being several orders of magnitude in excess of the time duration of each pulse;
c. sampling means connected to said source and pulse means for sampling said velocity signal during the occurrence of each of said timing pulses, said sampling means having signal storage means providing a sampling signal having successive amplitude levels each of which is substantially constant throughout one of said sample time periods;
d. an operational amplifier having first and second inputs and an output providing a signal which is a function of the difference of signals applied to said first and second inputs;
e. means for connecting said velocity signal and said sampling signal to said first and second inputs to derive from said output an output signal whose DC level varies during each one of said sample time periods as a function of vehicle acceleration;
f. means coupled to the output of said operational amplifier for producing output indications in response to output signals whose DC level is of a predetermined magnitude.

* * * * *